United States Patent
Kremer et al.

(10) Patent No.: US 6,238,452 B1
(45) Date of Patent: May 29, 2001

(54) METHOD FOR MAKING STEEL IN A LIQUID MELT-FED ELECTRIC FURNACE

(75) Inventors: André Kremer, Leudelange (LU); Guy Denier, Metz; Jean-Luc Roth, Hettange-Grande, both of (FR)

(73) Assignee: Paul Wurth, S.A., Luxembourg (LU)

( * ) Notice: Subject to any disclaimer, the term of this patent is extended or adjusted under 35 U.S.C. 154(b) by 0 days.

(21) Appl. No.: 09/202,756

(22) PCT Filed: Jun. 10, 1997

(86) PCT No.: PCT/EP97/03005

§ 371 Date: Dec. 16, 1998

§ 102(e) Date: Dec. 16, 1998

(87) PCT Pub. No.: WO98/01588

PCT Pub. Date: Jan. 15, 1998

(30) Foreign Application Priority Data

Jul. 3, 1996 (LU) .......................................... 88785

(51) Int. Cl.$^7$ .............................. C21B 13/12; C21C 5/30
(52) U.S. Cl. ................................ 75/10.42; 75/548; 75/581
(58) Field of Search .................................... 75/10.1, 10.4, 75/10.42, 40.63, 40.33, 548, 581

(56) References Cited

U.S. PATENT DOCUMENTS 4,090,869 * 5/1978 Antoine et al. ..................... 75/10.51

FOREIGN PATENT DOCUMENTS

| 2325597 | 12/1974 | (DE) . |
| 44 34 369 A1 | 3/1996 | (DE) . |
| 0 240 485 | 10/1987 | (EP) . |
| 0 630 977 A1 | 12/1994 | (EP) . |
| WO9632505 | * 4/1996 | (WO) . |

OTHER PUBLICATIONS

The Making, Shaping and Treating of Steel, United States Steel Corporation. 1964, p. 1112. No Month.*

* cited by examiner

Primary Examiner—Roy V. King
Assistant Examiner—Tima McGuthry-Banks
(74) Attorney, Agent, or Firm—Chapman and Cutler

(57) ABSTRACT

A method for making steel in an electric furnace, wherein a predetermined amount of liquid melt is fed into the electric furnace. The method comprises the steps of (a) continuously feeding a controlled flow of liquid melt into the furnace without interrupting the heating from the electric arc, (b) continuously injecting a refining gas into the furnace before the C and/or Si content of the metal bath reaches a predetermined value, until the end of the feeding process, and (c) pursuing the injection of refining gas after the predetermined amount of melt has been fed into the furnace, until the target value for the C and/or Si content of the metal bath has been reached.

20 Claims, 2 Drawing Sheets

METHOD FOR MAKING STEEL IN A LIQUID MELT-FED ELECTRIC FURNACE

This application is a national stage of PCT/EP97/03005, filed Jun. 10, 1997.

The present invention relates to a method of producing steel in an electric furnace by charging with molten pig iron.

A high proportion of steel scrap is recycled using electric furnaces such as arc furnaces. These furnaces make it possible to melt and re-use the steel scrap treated in this way in order to produce new steel products.

Some of the residual elements contained in the steel scrap such as copper, nickel, etc., cannot be separated from the steel and hence occur in the finished products. This means that the more the steel scrap is subjected to recycling operations, the greater the concentration of these residual elements. These elements cause problems for the production of certain products such as sheet steel, etc.

One way of reducing the concentration of residual elements in the steel obtained from steel scrap and of simultaneously improving the energy efficiency of the electric furnace consists in adding molten pig iron to the electric furnace. Now, because of the fairly high carbon and silicon content of the molten pig iron (typically 4.5% C and 0.6% Si), charging with molten pig iron leads to a considerable increase in the concentration of these elements in the metal bath. The result of this is a longer refining stage in the metal bath in order to reduce the carbon and silicon concentrations in the metal bath to target values, which are generally very low, e.g. for the carbon concentration the target value is between 0.05% and 0.1%.

To achieve this, traditional charging methods, after the charging with pig iron, inject a refining gas, oxygen for example, in order to reduce the carbon and silicon concentrations. With the concentrations of these elements being quite high, the rate at which oxygen is supplied must be moderated in order to avoid the desiliconising and decarburising reactions occurring too violently. In fact, in the presence of high carbon and silicon concentrations, the injected oxygen reacts very violently at the point of impact in the metal bath, leading locally to a very abrupt release of energy and of the reaction gas, such as CO for example. It is obvious that such a violent reaction is accompanied by splashes of steel and pig iron which risk fouling and damaging the cooling panels lining the inside of the furnace. Hence the need to reduce the rate at which oxygen is supplied in order to moderate the dynamics of the refining reaction.

However, due to the limited supply rate of oxygen during the refining, the latter operation takes quite a long time and, above a certain quantity of charged molten pig iron, it forms the limiting factor on the duration of a melting cycle in the furnace. In order to improve the performance of the arc furnace as regards its productivity, i.e. to reduce the duration of a melting cycle, it is therefore essential to reduce the duration of the refining in the metal bath.

The document EP-A-0 630 977 describes a process for the treatment of molten pig iron in a converter equipped with at least one electrode. It relates to a process in which the total amount of pig iron is charged into the converter before the electric arc is activated.

The object of the present invention is to propose a method of producing steel in an electric furnace by charging with molten pig iron which enables the duration of a melting cycle to be reduced.

In conformity with the invention, this objective is achieved by a method for producing steel in an electric furnace, in which a quantiity of scrap is charged into the electric furnace and molten by use of an electric arc a predetermined quantity of molten pig iron is charged into the electric furnace, after a part of the scrap is molten, and a refining gas is injected into the furnace after the planned quantity of pig iron is charged until a target value of the concentration of carbon and/or silicon in the metal bath is reached.

The quantity of molten pig iron is charged continously and at a controlled rate without interruption of the heating by the electric arc, and injection of the refining gas into the furnace starts during the continous charging before the concentration of carbon and/or of silicon in the metal bath has reached a predetermined limiting value, the injection taking place continuously until the end of the charging, and This method has the advantage, firstly, that the charging is carried out without switching off the power supply, i.e. without interruption of the heating by the electric arc. Consequently, the melting of the steel scrap is not interrupted and is carried out more rapidly than in traditional methods of charging with molten pig iron. Secondly, the refining by injection of a gas begins before the end of the charging, i.e. at a time which is earlier than in traditional charging methods. As a result of this, the duration of a melting cycle is reduced, even though the rate of injection of the gas is not increased.

Since the refining begins before the end of the charging, this method also makes it possible to reduce the maximum carbon and/or silicon concentration in the metal bath during a melting cycle by an adjustment of the rates of charging and of gas injection. At the beginning of the refining, the concentration, for example of carbon, in the metal bath is in fact significantly lower than that obtained in traditional methods in which the refining begins only after charging with the total quantity of molten pig iron (it is the same for the silicon concentration). Moreover, at least a part of the carbon in the bath is oxidised as it is supplied, so that the increase in the carbon concentration in the metal bath as charging proceeds is substantially reduced and so that its concentration does not exceed a predetermined limiting value, which for the carbon concentration for example is less than 2%, and preferably less than 1.5%. The silicon concentration behaves in the same way but on a reduced scale. The predetermined limiting value for the silicon concentration is less than 0.3% for example, preferably less than 0.2%.

The carbon and silicon concentrations being limited in this way, it is possible to increase the rate of oxygen supply without the refining reaction taking place too violently. In effect, because of the limited local amount of silicon and carbon, the refining reaction is no longer localised at the point of impact of the gas in the bath but the oxygen is carried intermediately on the iron. After stirring the phases that are present (metal and slag), the iron oxide produced in this way reacts subsequently with the silicon and the carbon that it encounters at places other than the point of injection. The release of the reaction gas, such as CO for example, and the splashes therefore occur more uniformly over the whole surface of the metal bath and consequently much less violently. Thus, an increase in the rate of oxygen supply and hence in the speed of refining can be achieved without causing splashes of steel and pig iron which are too large and which risk fouling and damaging the cooling panels lining the inside of the furnace. The melting cycles of the furnace are thus shortened and the productivity of the furnace increases.

It should be noted that the charging with pig iron is achieved without stoppage of the heating by the electric arc and that the roof of the furnace remains closed for the whole duration of the charging. The latter is carried out preferably through a lateral opening in the furnace. Since the roof is closed during the whole melting cycle, inputs of air into the furnace chamber are avoided and the nitrogen input is considerably reduced. Moreover, the earlier and continuous refining leads to a continual washing of the metal bath by the reaction gases like CO. Through this washing by CO, the nitrogen dissolved in the metal bath is dissolved in the CO bubbles, which take it out of the metal bath. The nitrogen is then removed from the vessel together with the reaction gas by the furnace exhaust system. Such continuous washing thus leads to very low nitrogen concentrations in the steel produced.

As a result of this, the method according to the invention is perfectly adapted to the production of quality steels, particularly to that of very ductile steels, for which very low nitrogen concentrations are required.

The rate of supply of the refining gas and the rate of charging with pig iron are preferably adjusted so that the carbon and/or silicon concentration in the metal bath no longer increases after the refining has started. It is possible, for example, to adapt the rate of charging with pig iron to the maximum rate of oxygen supply so as to oxidise all the carbon in the bath as it is supplied. In this way, the carbon and silicon concentrations in the metal bath may be very precisely controlled during a melting cycle and it is possible to limit the maximum concentration to very low values, e.g. for the carbon, to a concentration of 0.5%.

According to a preferred execution of the method, the refining gas is injected into one of the two quadrants of the furnace, which are opposite the feed opening relating to an electrode of the electric furnace. In this case, the direction of the gas injection is adjusted so that a first vertical plane containing the direction of charging and a second vertical plane containing the direction of injection intersect each other substantially in the region of the furnace electrode.

The reaction gases, such as CO for example, which are released continuously during the refining, are more abundant in the region where the fluxes of gas and pig iron meet each other than in the neighbouring regions. On leaving the metal bath, these gases displace the nitrogen in the vessel and create above the surface of the metal bath a protective atmosphere against the input of nitrogen into the bath.

Because of the very high temperatures in the neighbourhood of the electric arc, the presence of nitrogen in this region leads to a preferential nitriding of the metal bath. It is therefore greatly preferable to direct the fluxes of pig iron and refining gas so that they meet each other in the region located below the electric arc. The protective atmosphere created in the neighbourhood of the arc is consequently particularly dense and an input of nitrogen into the bath may be very effectively prevented.

It should be noted that the charging with molten pig iron can be carried out with an amount lying between 20% and 60% of the total furnace charge and that the rate of charging with pig iron is preferably less than 4% of the capacity of the furnace per minute. The rate at which oxygen is injected per tonne of furnace capacity lies with advantage between 0.5 and 1 $m^3$ $O_2$ per minute.

In what follows, a way of carrying out the method is compared with a traditional charging method, using an example illustrated by FIGS. 1 and 2. These show:

The assumptions common to both methods of charging with molten pig iron are as follows:
 capacity of the furnace: 100 t+20 t in the heel;
 charging: 66 t steel scrap+44 t molten pig iron, or 40%;
 maximum active furnace power: 60 MW;
 carbon concentration in the pig iron 4.5%, in the steel scrap 0.5%.

In this example, only the carbon concentration in the metal bath is considered. The silicon concentration shows a behaviour essentially the same as that of the carbon concentration, except that the silicon oxidises before the carbon. As a result, after having reached the target value of the carbon concentration, the silicon is almost eliminated from the metal bath.

With a view to facilitating the comparison, a start is first made with the same maximum rate of oxygen supply for both methods, a rate which is of the order of 4000 $m^3$/h and which corresponds to a decarburising rate of 60 kg carbon/min.

Figure 1:
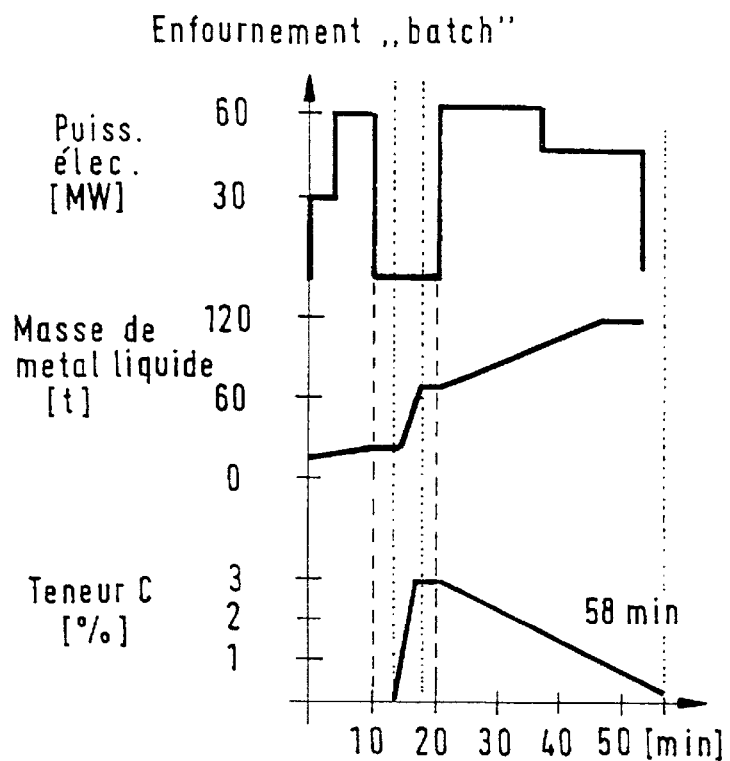
FIG. 1: the variations with time of the electric power, of the quantity of molten metal and of the carbon concentration for a traditional charging method.

In the traditional method (FIG. 1), the electric furnace is first run at maximum power to melt a certain quantity of steel scrap. After ten minutes, the electric arc is once again switched off, the furnace cover is removed and the charging with molten pig iron is carried out for 5 minutes. After the charging, the furnace cover is replaced and the arc is switched on again. It should be noted that, because of the time required to open and close the furnace cover, a 5 minute charge means that the furnace is shut down for approximately 10 minutes.

During the charging with pig iron, the mass of molten metal and the carbon concentration in the metal bath increase linearly because of the charging rate, and at the end of the charging, the carbon concentration reaches a value of 3% (the silicon concentration amounts to 0.4%). It is mainly because of these very high silicon and carbon concentrations that the rate of oxygen supply must be limited during the refining to one of 4000 $m^3$/h. During this refining, which begins after the cover has been closed, the carbon concentration is reduced at a substantially linear rate to end up at a value of less than 0.1%.

It should be noted that, because of the quantity of carbon being loaded with the pig iron and steel scrap and because of the limited oxygen supply rate, the decarburisation lasts for 38 minutes in all. Because it begins only 20 minutes after the beginning of the melting cycle, the whole melting cycle lasts for 58 minutes.

Figure 2:
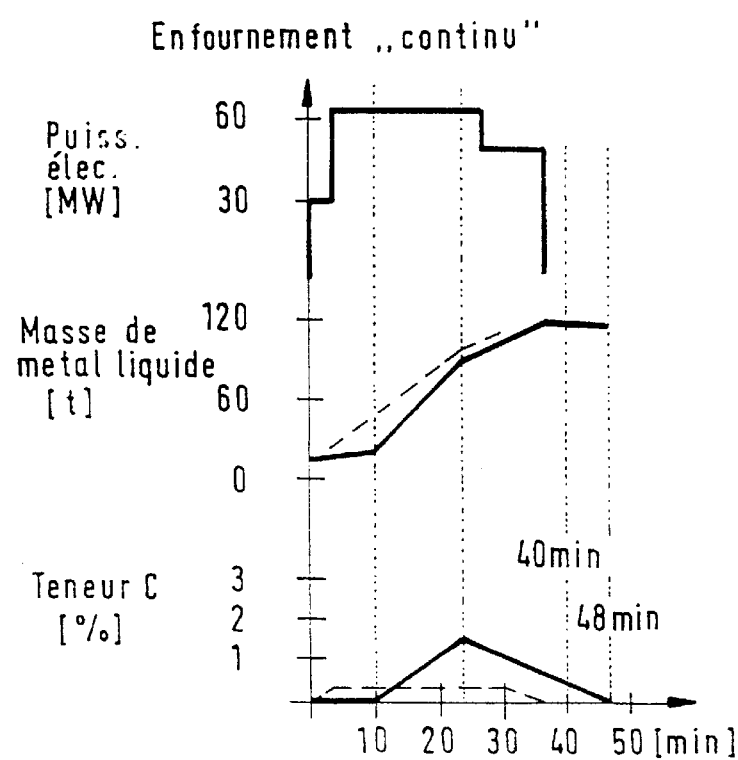
FIG. 2: the variations with time of the electric power, of the quantity of molten metal and of the carbon concentration for a charging method according to the invention.
Figure 3:
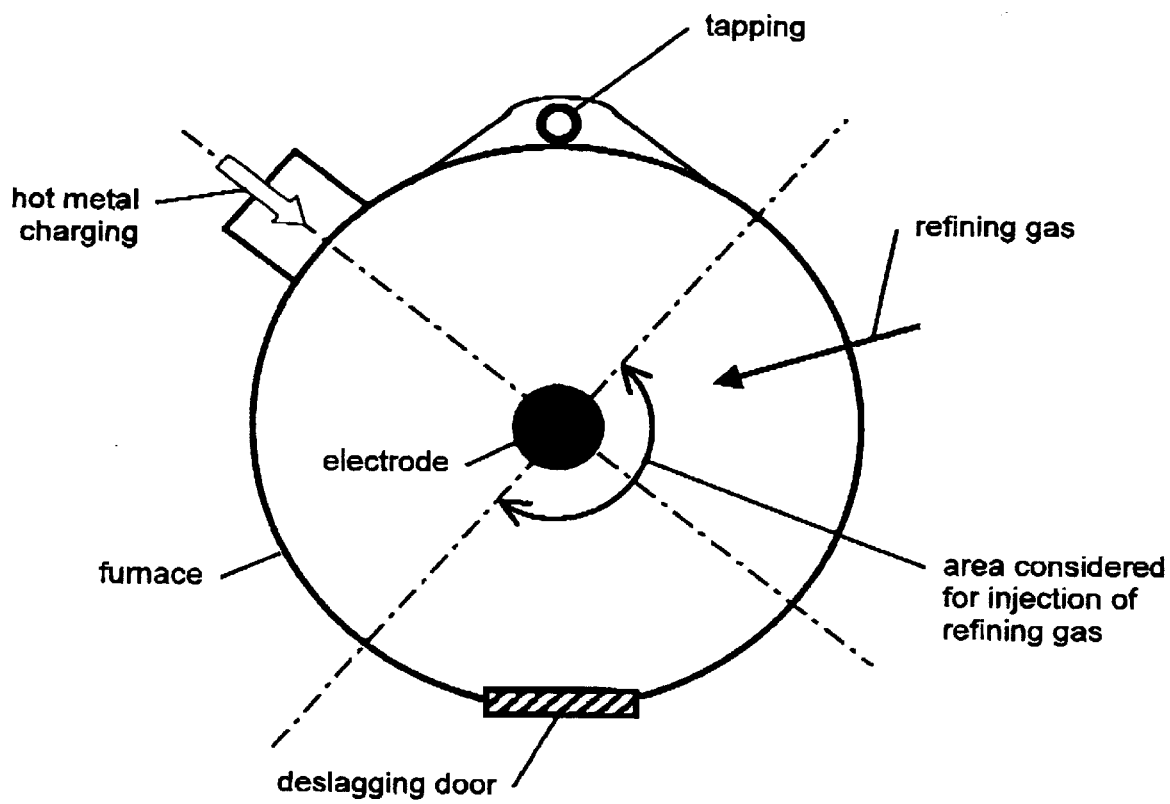
FIG. 3: the injection of the refining gas in the furnace.

In the method according to the invention, illustrated with the help of FIG. 2, the charging begins after 10 minutes and continues at a rate of 3 t/min, i.e. taking about 15 minutes. During the charging, the furnace remains powered so that the quantity of molten metal in the furnace increases not only because of the charging but also because of the simultaneous melting of the steel scrap. Consequently, the melting of the steel scrap ceases 10 minutes sooner than in the method of FIG. 1.

Moreover, the decarburisation, which requires 38 minutes for the same rate of 4000 $m^3$/h, begins a little after the beginning of charging before the carbon concentration in the metal bath exceeds a value of 1.5%. Beginning the charging in this way, earlier than in the method of FIG. 1, already enables the duration of the melting cycle to be reduced by more than 10%. If the maximum oxygen supply rate is now increased, which is possible without the risk of splashes because of the low carbon concentration in the metal bath, the decarburisation rate increases and the duration of a melting cycle is reduced still further. As a result, the method according to the invention enables the productivity of an electric furnace to be improved by at least 10%.

In an optimised version of the continuous charging with pig iron, it is possible to adapt the rate of charging with pig iron to the maximum supply rate of the oxygen for decarburisation, so as to oxidise the carbon as it is supplied to the metal bath. In this way, it is possible to limit the carbon concentration to values below 0.5%. Because of this low carbon concentration, the maximum oxygen supply rate can be considerably increased so as to increase the decarburisation rate. For a pig iron with a carbon concentration of 4.5%, the relation between the pig iron supply rate and the oxygen supply rate is then:

$$q \text{ pig iron } (t/\text{min}) = qO_2 \text{ } (m^3/\text{min})/43.$$

Such a method with early and optimised charging is represented by a broken line in FIG. 2 for a maximum oxygen supply rate of 5200 m³/h. The charging in this case occurs at a rate of 2 t/min. It can be seen that the charging begins as soon as the cycle begins and that consequently the mass of molten metal increases linearly from the start. The carbon concentration, on the other hand, remains substantially constant during the whole charging and is less than 0.5%. This method makes it possible to increase productivity by 20% in comparison with traditional charging methods.

What is claimed is:

1. Method of producing steel in an electric furnace, comprising the following steps:

charging scrap into an electric furnace;

melting the scrap by use of an electric arc;

after a part of said scrap is molten, charging molten pig iron into the electric furnace continuously at a rate without interruption of heating by the electric arc providing a metal bath; and injecting refining gas into the furnace continuously at a rate during the charging of the pig iron, wherein the injection starts at a point when a quantity of pig iron is charged into the furnace and before a limit value of carbon and/or silicon concentration in the metal bath is reached, and ends with the end of charging.

2. Method according to claim 1, wherein the rate of charging and the rate of injection of the refining gas are adjusted so that to prevent increase of the carbon and/or silicon concentration in the metal bath after the beginning of refining.

3. Method according to claim 2, wherein the refining gas is injected into one of the two quadrants of the furnace, which are both opposite to a feed opening relating to a furnace electrode, in such a way that a vertical plane containing the direction of charging and a vertical plane containing the direction of injection intersect each other substantially in the region of the furnace electrode.

4. Method according to claim 2, wherein the limit value of the carbon concentration in the metal bath is less than 2%.

5. Method according to claim 2, wherein the quantity of molten pig iron is between 20% and 60% of a total charge of the furnace.

6. Method according to claim 2, wherein the rate of charging with pig iron is less than 4% of the furnace capacity per minute.

7. Method according to claim 1, wherein the refining gas is injected into one of the two quadrants of the furnace which are both opposite to a feed opening relating to an electrode of the electric furnace, the direction of injection of the gas being such that a first vertical plane containing the direction of charging and a second vertical plane containing the direction of injection intersect each other substantially in the region of the furnace electrode.

8. Method according to claim 1, wherein the limit value of the carbon concentration in the metal bath is less than 2%.

9. Method according to claim 1, wherein the quantity of molten pig iron is between 20% and 60% of a total charge of the furnace.

10. Method according to claim 1, wherein the rate of charging with pig iron is less than 4% of the furnace capacity per minute.

11. Method according to claim 1, wherein the rate of injection of the refining gas per tonne of capacity of the furnace is between 0.5 and 1 m³/tonne per minute.

12. Method according to claim 1, wherein the refining gas is $O_2$.

13. Method of producing steel in an electric furnace, comprising the following steps:

providing an electric furnace having an electrode for heating a metal bath with an electric arc and a feed opening relating to the electrode for injection of refining gas;

charging scrap into the furnace;

melting the scrap by use of the electric arc;

after a part of said scrap is molten, charging molten pig iron into the electric furnace continuously at a controlled rate without interruption of the heating by the electric arc; and after a predetermined quantity of pig iron is charged into the furnace, continuously injecting refining gas at an adjustable rate into one of the two quadrants of the furnace which are both opposite to the feed opening, in such a way that a vertical plane containing the direction of injection substantially intersects a vertical plane containing the direction of charging.

14. Method according to claim 13, wherein the quantity of molten pig iron is between 20% and 60% of a total charge of the furnace.

15. Method according to claim 14, wherein the injection starts before a limit value of carbon and/or silicon concentration in the metal bath is reached, and ends with the end of charging.

16. Method according to claim 15, wherein the rate of charging and the rate of injection of the refining gas are being adjusted so that to prevent increase of the carbon and/or silicon concentration in the metal bath after beginning of refining.

17. Method according to claim 16, wherein the limit value of the carbon concentration in the metal bath is less than 2%.

18. Method according to claim 17, wherein the rate of charging with pig iron is less than 4% of the furnace capacity per minute.

19. Method according to claim 18, wherein rate of injection of refining gas per tonne of the furnace capacity is between 0.5 and 1 m³/min.

20. Method according to claim 19, wherein the limit value of the silicon concentration in the metal bath is less than 0.3%.

* * * * *